United States Patent
Harris et al.

(10) Patent No.: US 10,604,696 B2
(45) Date of Patent: Mar. 31, 2020

(54) PROCESS FOR ACIDIZING

(71) Applicant: Cleansorb Limited, Guildford, Surrey (GB)

(72) Inventors: Ralph Edmund Harris, Guildford (GB); Duncan Holdsworth, Guildford (GB)

(73) Assignee: Cleansorb Limited, Guildford, Surrey (GB)

(*) Notice: Subject to any disclaimer, the term of this patent is extended or adjusted under 35 U.S.C. 154(b) by 263 days.

(21) Appl. No.: 15/111,030

(22) PCT Filed: Jan. 12, 2015

(86) PCT No.: PCT/GB2015/050047
§ 371 (c)(1),
(2) Date: Jul. 12, 2016

(87) PCT Pub. No.: WO2015/107328
PCT Pub. Date: Jul. 23, 2015

(65) Prior Publication Data
US 2016/0333256 A1    Nov. 17, 2016

(30) Foreign Application Priority Data
Jan. 17, 2014   (GB) .................................. 1400802.3

(51) Int. Cl.
*C09K 8/72* (2006.01)
*C09K 8/52* (2006.01)
(Continued)

(52) U.S. Cl.
CPC .................. *C09K 8/72* (2013.01); *C09K 8/52* (2013.01); *E21B 37/00* (2013.01); *E21B 43/25* (2013.01)

(58) Field of Classification Search
CPC .............. C09K 8/72; C09K 8/52; E21B 37/00
(Continued)

(56) References Cited

U.S. PATENT DOCUMENTS 4,590,077 A   5/1986   Trop
4,679,631 A   7/1987   Dill et al.
(Continued)

FOREIGN PATENT DOCUMENTS

RU   2122633 C1   11/1998
RU   2249097 C2   3/2005

OTHER PUBLICATIONS

Russian Search Report for Application No. 2016133599/03 dated Feb. 13, 2018, "Process for Acidizing".
(Continued)

*Primary Examiner* — Angela M DiTrani Leff
*Assistant Examiner* — Ashish K Varma
(74) *Attorney, Agent, or Firm* — Hamilton, Brook, Smith & Reynolds, P.C.

(57) ABSTRACT

The invention relates to in-situ acidizing processes that involve the dissolution of an acid-soluble material. Treatment fluids have been identified that can effectively dissolve acid-soluble materials at low temperatures, such as temperatures of 30° C. or lower. In some embodiments, the processes may also be usefully employed at higher temperatures. The processes and treatment fluids of the invention can advantageously be used to dissolve acid-soluble materials, including filter cakes, in underground formations.

11 Claims, 1 Drawing Sheet

(51) Int. Cl.
*E21B 37/00* (2006.01)
*E21B 43/25* (2006.01)

(58) Field of Classification Search
USPC .......................................... 166/300
See application file for complete search history.

(56) References Cited

U.S. PATENT DOCUMENTS

| | | | | |
|---|---|---|---|---|
| 4,683,954 A * | 8/1987 | Walker | ................... | C09K 8/528 166/307 |
| 4,823,874 A * | 4/1989 | Ford | ................... | C09K 8/74 166/279 |
| 5,678,632 A * | 10/1997 | Moses | ................... | C09K 8/528 166/300 |
| 5,763,888 A | 6/1998 | Glasheen et al. | | |
| 2013/0213659 A1 | 8/2013 | Luyster et al. | | |
| 2013/0264057 A1 | 10/2013 | Thaemlitz | | |
| 2014/0113843 A1* | 4/2014 | Shumway | ................... | C09K 8/74 507/261 |

OTHER PUBLICATIONS

International Search Report and Written Opinion for Int'l Application No. PCT/GB2015/050047; titled: Process for Acidizing, dated Mar. 30, 2015.
Great Britain Search Report for GB Application No. GB1400802.3; Date of Search: Feb. 28, 2014.
Innovations in Food Technology, Issue 16, Aug. 2002, Retrieved from the Internet: http://www.jungbunzlauer.com/fileadmin/content/_PDF/Calcium_Lactate_Gluconate_-the_innovative_solution_for_extra_Calcium_Aug02.pdf, 3 pages total.
Phadungath, C. and L. E. Metzger, "Effect of sodium gluconate on the solubility of calcium lactate," J. Dairy Sci., 94: 4843-4849 (2011).
Rabie et al., "A New Environmentally Friendly Acidizing Fluid for HP/HT Matrix Acidizing Treatments with Enhanced Product Solubility," SPE-173751-MS, 33 pages (2015).
Notification Concerning Transmittal of International Preliminary Report on Patentability for International No. PCT/GB2015/050047; titled: Process for Acidizing, dated: Jul. 28, 2016.

* cited by examiner

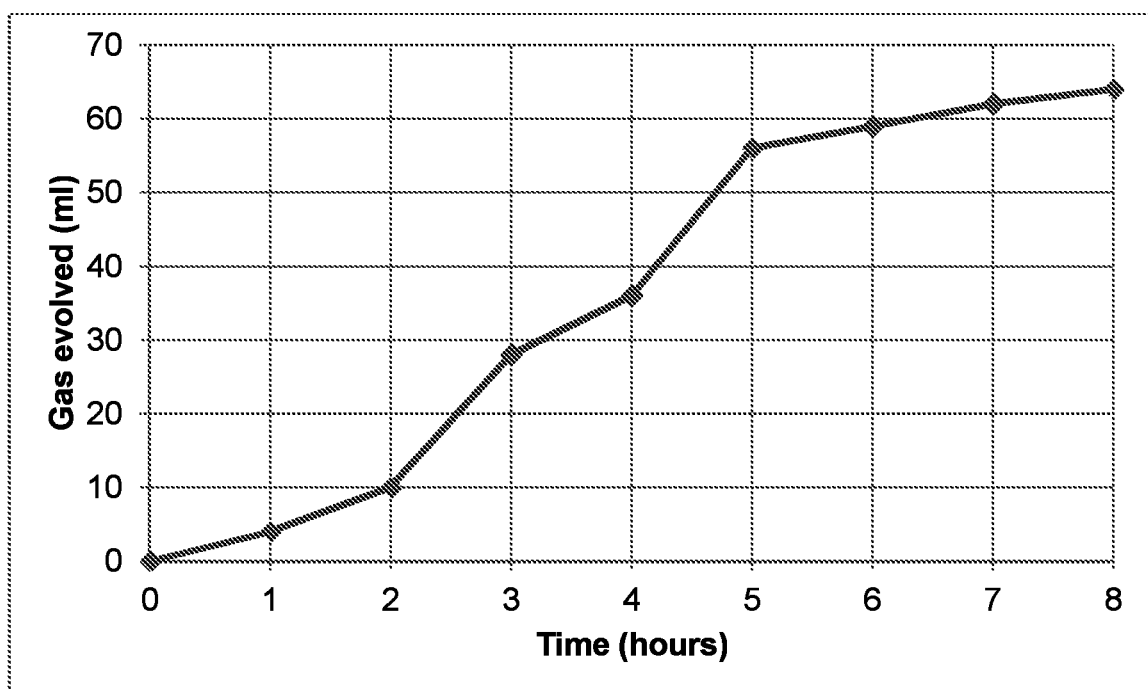

PROCESS FOR ACIDIZING

This application is the U.S. National Stage of International Application No. PCT/GB2015/050047, filed Jan. 12, 2015, which designates the U.S., published in English, and claims priority under 35 U.S.C. §§ 119 or 365(c) to Great Britain Application No. 1400802.3, filed Jan. 17, 2014. The entire teachings of the above applications are incorporated herein by reference.

BACKGROUND TO THE INVENTION

The use of acidizing systems based on acid precursors has become widespread in oilfield chemical treatments over the last decade or so. Producing organic acid in-situ from acid precursors, rather than using an organic or mineral acid directly, can deliver excellent zonal coverage. In addition the use of acid precursors offers considerable health, safety and environmental advantages.

Treatment formulations based on acid precursors are generally designed to deliver a certain amount of acid from the treatment fluid within a desired timescale at the prevailing temperature. The acid produced from the acid precursor is available to solubilise at least a portion of the targeted acid-soluble materials, for example carbonate rock, carbonate scale or carbonate components of drill-in fluid filter cakes, so that they can be removed from the treated zone in the form of dissolved salts.

The most commonly used acid precursors are carboxylic acid esters, particularly esters of formic, acetic and lactic acid. These are suited to use in different temperature ranges. They have a relatively high yield of acid, with the acid precursors and the products of acidizing all being soluble.

If using these acid precursors in the absence of an enzyme or other catalyst, the typical temperature range in which acetic and lactic acid precursors are used is from about 85° C. and preferably from about 100° C. up to about 160° C. Precursors of formic acid hydrolyse more readily than precursors of acetic or lactic acid, so can generate acid in-situ at lower temperatures. The typical temperature range in which precursors of formic acid are used is from about 30° C. to about 120° C.

The rate of acid generation from precursors of formic, acetic or lactic acid may, if desired, be increased using a suitable enzyme catalyst such as a lipase, esterase or protease enzyme (U.S. Pat. No. 5,678,632). Treatment formulations are designed to give acceptable rates of acid generation and therefore acceptable treatment (shut-in) times under the conditions of use.

Unfortunately, at temperatures lower than about 30° C. acidizing based on the most commonly used acid precursors can proceed more slowly than is generally acceptable to operators.

For example, at 27° C. it typically takes about 6 days to convert a formic acid precursor, used at 10% w/v in a treatment fluid, to formic acid. This can be reduced to about 2 days by incorporating enough of a suitable enzyme into the treatment formulation. However, this increases the cost.

There are a number of low temperature underground formations found worldwide at temperatures below about 30° C. For example some formations in Canada and Russia are at temperatures as low as 7° C. At such low temperatures, acidizing treatments based on formic acid precursors, even those containing ester-hydrolysing enzymes, would require long shut-in periods likely to be unacceptable to operators.

Another problem associated with the use of formic acid precursors in dense formate brines is the potential for precipitation of calcium salts. In such treatments, the solubility of calcium formate may be exceeded, resulting in the precipitation of calcium formate as a solid in the treatment fluid. US 2013/0213659 teaches that by including a suitable chelant or an alkyl glucoside surfactant in the treatment fluid, precipitation of calcium formate when acidizing with a formic acid precursor in dense formate brines may be avoided.

There is a continuing need for acidizing processes that are low hazard and that are based on environmentally acceptable components.

There is a specific need for in-situ acidizing processes that are effective within acceptable treatment timescales at low temperatures, particularly at temperatures in the range from about 5° C. to about 30° C., for oilfield and other applications. Furthermore, it is necessary to avoid the precipitation of solid by-products, such as acid salts, as the acidizing process takes place.

SUMMARY OF THE INVENTION

It is an object of the present invention to provide a simple and effective acidizing method for dissolving acid-soluble material within an underground formation or dissolving acid soluble material in tubulars, tanks, pipelines, reverse osmosis units and the like.

It is a particular object of the present invention to provide simple and effective methods for the effective treatment of filter cakes, including their treatment over long horizontal intervals.

It is a further object of the present invention to provide methods that are environmentally acceptable by utilising components that are of low environmental impact.

It is a still further object of the present invention to provide methods that are effective at low temperatures, for example temperatures of 30° C. or lower.

Further still, it is an object of the present invention to provide methods that do not suffer from precipitation of acid salts when the acidizing process is underway.

The inventors have now found that these objects can be achieved by using glucono delta lactone, as an acid precursor, in combination with a salt effective for preventing the precipitation of, and/or dissolving, alkaline earth metal salts of gluconic acid. In particular, the inventors have found that glucono delta lactone is an acid precursor that generates gluconic acid at rates that are useable for acidizing at temperatures below about 30° C. Although such acidizing has the potential to produce alkaline earth salts of gluconic acid, which have low solubility and are therefore liable to precipitate, the addition of the salt component is effective for preventing the precipitation of, and/or redissolving, alkaline earth metal salts of gluconic acid. Consequently, sufficiently high concentrations of glucono delta lactone can be incorporated into a treatment fluid to enable production of sufficient gluconic acid to achieve effective acidizing (without precipitation of gluconic acid salts).

Specifically, the present invention provides an acidizing process which comprises:

(a) providing a treatment fluid that comprises dissolved glucono delta lactone;

(b) contacting the treatment fluid with an acid-soluble material; and (c) allowing the glucono delta lactone to hydrolyse to produce gluconic acid and the gluconic acid to dissolve at least a portion of the acid-soluble material;

wherein during or following the step (c) the treatment fluid comprises a dissolved salt effective for preventing precipitation of alkaline earth metal salts of gluconic acid and/or dissolving precipitated alkaline earth metal salts of gluconic acid.

The present invention also provides a treatment fluid effective for dissolving acid-soluble material, which treatment fluid comprises: (i) glucono delta lactone; and (ii) at least one of sodium lactate, sodium acetate, potassium lactate, potassium acetate, ammonium lactate and ammonium acetate.

The present invention thus provides an in-situ acidizing process that is effective at low temperature. It provides an in-situ acidizing process that proceeds at faster rates than processes based on esters of formic acid. It also provides a process where glucono delta lactone may be used for acidizing at concentrations higher than a few percent by weight, without encountering the problem of precipitation of poorly soluble gluconate salts. It may be used for the acid treatment of underground formations, including water—or hydrocarbon-bearing formations, particularly those at temperatures lower than 30° C.

DESCRIPTION OF THE FIGURES

FIG. 1 shows the evolution of carbon dioxide gas (ml) from calcium carbonate as a function of time (hours) when using a treatment fluid of the invention, as described in more detail in Example 3.

DETAILED DESCRIPTION OF THE INVENTION

The process of the present invention may be used to dissolve carbonate rocks, fluid loss additives, drill-in fluid components or scales, including, but not being limited to, calcium carbonate, magnesium carbonate, calcium magnesium carbonate, chalk, limestone, marble or dolomite. The acid-soluble material normally contains at least one alkaline earth metal, such as at least one of calcium and magnesium. The acid-soluble material thus normally releases alkaline earth metal ions, for example at least one of calcium or magnesium ions, when it is dissolved by an acid (e.g., the gluconic acid or an acid generated from another acid precursor).

The process may be applied to hydrocarbon reservoirs, such as oil or gas reservoirs, or to water reservoirs in underground formations, where specific acidizing applications include deep matrix acidizing, acidizing of natural fracture networks, or filter cake treatment, including the treatment of filter cakes produced from drilling with water-based or oil-based drill-in fluids.

The process may also be used for the acid treatment of acid-soluble materials such as scales in tubulars, tanks, pipelines, reverse osmosis units and the like, particularly at low ambient temperatures.

The glucono delta lactone used in the present invention is an acid precursor that generates gluconic acid by hydrolysis in a treatment fluid at temperatures below 30° C. (although it can of course also generate gluconic acid at higher temperatures and typically does so rapidly). Gluconic acid is capable of dissolving the acid-soluble materials described herein.

Two potential barriers to the use of glucono delta lactone as an acid precursor for use in dissolving acid-soluble materials have been overcome in order to arrive at the present invention. A first barrier is that glucono delta lactone suffers from a comparatively poor acid yield on a weight basis and therefore has limited dissolving capacity. In particular, only one gluconic acid molecule is produced per molecule of delta glucono lactone, compared to two formic acid molecules per molecule of a typical formic acid precursor. In addition gluconic acid is a larger molecule than formic acid. This means that the dissolving power of glucono delta lactone on a weight basis is only about half that of typical formic acid precursors. It therefore must typically be included in larger amounts by weight than would a typical formic acid precursor.

This first barrier can be overcome by ensuring that a sufficient amount by weight of glucono delta lactone is incorporated into the treatment fluid. The second barrier is the low solubility of alkaline earth salts of gluconic acid. Such salts can be formed when alkaline earth metal ions are released from an acid-soluble material containing alkaline earth metal, as it is dissolved by an acid (e.g. by the gluconic acid). For example, the solubility of calcium gluconate is only about 3.5% by weight. This means that acidizing a calcium carbonate material with more than a few percent glucono delta lactone would, if no further steps were taken, result in the precipitation of calcium gluconate within the treatment fluid as acidizing proceeded, which is highly undesirable.

The present invention solves this problem by including a salt that is effective for preventing precipitation of alkaline earth metal salts of gluconic acid and/or dissolving precipitated alkaline earth metal salts of gluconic acid. This means that it becomes possible to incorporate a sufficiently large amount of glucono delta lactone to achieve effective acidizing, while still avoiding subsequent long-term precipitation of alkaline earth metal salts of gluconic acid when the acidizing is underway.

Sufficient glucono delta lactone is incorporated into the treatment fluid to deliver the required amount of gluconic acid when fully hydrolysed. Typically this will be a minimum of 2 to 3% w/v glucono delta lactone (for example at least 2% w/v) and preferably 5 to 20% w/v, although higher or lower amounts may be used if desired.

The salt effective for preventing the precipitation of, or dissolving precipitates of, alkaline earth metal salts of gluconic acid in the treatment fluid must be present (dissolved) in the treatment fluid during or following the step (c), i.e. after the treatment fluid has been contacted with the acid-soluble material in the step (b). This ensures that it can act to at least reduce and preferably prevent precipitation of gluconic acid salts as the acidizing proceeds, and/or can redissolve any gluconic acid salts that may already have precipitated. Typically the salt is present in the treatment fluid during or following the step (c) in an amount sufficient to prevent the precipitation of alkaline earth metal salts of gluconic acid and to redissolve any alkaline earth metal salts of gluconic acid that have precipitated.

In a first embodiment, the treatment fluid provided in the step (a) already comprises the salt. In this first embodiment, a salt effective for preventing the precipitation of alkaline earth metal salts of gluconic acid in the treatment fluid at the target temperature is selected and is incorporated into the treatment fluid at the desired concentration. The treatment fluid provided in the step (a) thus comprises both the glucono delta lactone and the salt. Preferably the weight ratio of the glucono delta lactone and the salt in the treatment fluid is from 10:1 to 1:5, although other weight ratios are possible. For example, the weight ratio of the glucono delta lactone and the salt in the treatment fluid may be from 3:1 to 1:3, e.g. from 2:1 to 1:2. This weight ratio typically refers to the treatment fluid that is provided in the step (a), i.e. prior to it being contacted with the acid-soluble material. Typically in this embodiment the presence of the salt throughout the process means that precipitates of gluconic acid salts do not form, i.e. the salt is effective for preventing precipitation of the gluconic acid salts.

Salts effective for preventing the precipitation of alkaline earth metal salts of gluconic acid that may be added directly to the treatment fluid may be readily identified by carrying out suitable laboratory tests (to confirm the absence of insoluble gluconate salts following acidizing). Preferred salts are lactate or acetate salts including sodium lactate, sodium acetate, potassium lactate, potassium acetate, ammonium lactate, ammonium acetate, calcium acetate or magnesium acetate. Most preferred are sodium acetate and sodium lactate. If a lactate salt is used, the lactate may be D-lactate, L-lactate or DL-lactate. For example, if sodium lactate is used then it may be sodium D-lactate, sodium L-lactate or sodium DL-lactate.

In a second embodiment, the required salt is instead formed in-situ during or following the step (c). In particular, the salt may be generated within the treatment fluid when it comes into contact with acid soluble material in the zone to be treated. For example, a suitable salt may be generated in-situ by providing a treatment fluid in the step (a) that contains a suitable acid precursor in addition to the glucono delta lactone. This acid precursor is typically an organic acid precursor (e.g. an ester, orthoester, polyester or polyorthoester) that may hydrolyse to form an organic acid. In the presence of suitable acid-soluble materials (for example, calcium carbonate or magnesium carbonate) the organic acid generated may react to form the required salt.

In particular, the salt may be generated in-situ in the treatment fluid during or following the step (c) by a reaction between a portion of the acid-soluble material and an acid generated from an acid precursor (other than glucono delta lactone) that is comprised in the treatment fluid in the step (a).

Organic acid precursors suitable for generating suitable salts may be readily identified by carrying out suitable laboratory tests (to confirm the absence of insoluble gluconate salts following acidizing). Preferred organic acid precursors are esters of lactic or acetic acid and polyesters which hydrolyse to generate lactic acid. Most preferred are acetate esters of glycerol, ethylene glycol or diethylene glycol, lactate esters of C1-C4 alcohols and polylactic acid. The resulting salt generated in-situ in the treatment fluid during or following the step (c) is thus preferably selected from lactate or acetate salts including calcium lactate, magnesium lactate, calcium acetate or magnesium acetate. Most preferred are calcium acetate and calcium lactate. If the resulting salt generated in-situ in the treatment fluid is a lactate salt then the lactate may be D-lactate, L-lactate or DL-lactate.

Preferably the acid precursor in the treatment fluid provided in the step (a) is present in an amount sufficient to generate salt such that the weight ratio of the glucono delta lactone and the salt is from 10:1 to 1:5, although other weight ratios are possible. For example, the weight ratio of the glucono delta lactone and the salt may be from 3:1 to 1:3, e.g. from 2:1 to 1:2.

It will be appreciated that depending on the relative rate at which the acid precursor and the glucono delta lactone hydrolyse, it is possible that sufficient glucono delta lactone may have reacted with acid-soluble material to initiate precipitation of some alkaline earth metal salt of gluconic acid before sufficient hydrolysis of acid precursor has occurred to yields salts that prevent such precipitation. In this case, some precipitation of gluconic acid salt may initially occur, with the precipitate then redissolving as more of the organic acid precursor hydrolyses. Thus, the dissolved salt present in the treatment fluid during/following step (c) may either be one that is effective simply for preventing precipitation (including initially) of the alkaline earth metal salts of gluconic acid. Alternatively, it may be effective both for: (i) dissolving precipitated alkaline earth metal salts of gluconic acid; and (ii) for preventing precipitation of (further) alkaline earth metal salts of gluconic acid. For the avoidance of doubt, it is emphasised that the process of the present invention provides for both possibilities.

Normally, all components of the treatment fluid will be soluble in the treatment fluid at their concentration of use, i.e. they will be dissolved in the treatment fluid. They may, if not soluble, be dispersed in the treatment fluid.

The treatment fluid may be prepared by any method known to one skilled in the art. Generally the components may be mixed in any order. It will be understood by those skilled in the art that treatment fluids used to treat underground formations typically need to be made up at a certain density.

The treatment fluid is normally prepared by dissolving the components in suitable water. Examples include city (drinking) water, produced water, sea water or oilfield brines, such as will be well known to those skilled in the art. The treatment fluid is therefore normally an aqueous treatment fluid, i.e. a treatment fluid that comprises water (e.g. at least 50 wt % water). References herein to solubility also refer to solubility in water, unless otherwise specified.

If using an organic acid precursor such as an ester above the concentration at which it is fully soluble, it is not outside of the scope of the present invention that an emulsion of the organic acid precursor may be present.

After preparing the treatment fluid, it is introduced into the target zone by any method known to those skilled in the art. This may include introduction into an underground formation, for example via the drill string, coiled tubing, work string or by bullheading. It may also include introduction into tubulars, tanks, pipelines, reverse osmosis units and the like.

The process may be used when acidizing with glucono delta lactone. Acidizing applications may include, but not be limited to, acidizing of underground formations, including treatment of filter cakes in openhole wellbores, particularly those with sand control completions, treatment of formation damage such as scales containing acid-soluble components, treatments directed at increasing the permeability or porosity of the underground formation, for example by dissolving carbonate rock in the rock matrix or natural or induced fractures, including acid fracturing treatments, or treatments to dissolve acid-soluble material in pipelines, tubulars or tanks.

The volume of treatment fluid to be used will be appropriate to the type of treatment and will be known to those skilled in art.

The treatment fluid is then left for a period long enough for the desired amount of gluconic acid to be produced from the delta glucono lactone and (optionally) for organic acid to be produced from any precursor of another organic acid included as a component of a system used for generating salts effective for preventing the precipitation of alkaline earth metal salts of gluconic acid. When generating gluconic acid at temperatures in the range of between about 5° C. and about 30° C. a shut in period of between 6 hours and 7 days will normally be sufficient, depending on the specific temperature at which the treatment is conducted. The temperature in the step (c) of the process of the invention may, for example, be 30° C. or lower, for example from 5 to 30° C., from 5 to 25° C. or even from 5 to 20° C.

While the process of the present invention is particularly suited to acidizing at low temperatures, particularly those below about 30° C., it may also be operated at higher temperatures. In particular, in acid fracturing treatments there is a need for a rapid reaction rate so that the acid may etch fracture faces. Use of treatment fluids of the present invention at a sufficiently high temperature may permit sufficiently high rates of generation of gluconic acid to etch fracture faces in acid fracturing, while avoiding the deposition of alkaline earth metal salts of gluconic acid. One familiar with the art of acid fracturing would be able to design acid fracturing treatments based on the treatment fluids of the present invention. In a preferred embodiment, suitable forms (for example prills or fibres) of polyesters may be incorporated into treatment fluids of the present invention used for acid fracturing. These hydrolyse to generate lactic acid, leading to the formation of salts effective for preventing the precipitation of alkaline earth metal salts of gluconic acid but may also assist with acidizing.

It will be understood by one skilled in the art that, at the end of treatments according to the present invention, there will be no precipitated alkaline earth metal salt of gluconate present in the spent treatment fluid. It is not outside the scope of the present invention that a precipitate may form and then subsequently dissolve (for example as hydrolysis of an acetate or lactate ester and subsequent reaction of the acid with calcium carbonate results in formation of calcium acetate or calcium lactate). One skilled in the art will understand that in some treatment situations, for example filter cake cleanup or acid fracturing, there may be benefits in forming a temporary precipitate as this may prevent premature leak-off of the well treatment fluid.

Normally, the rate of gluconic acid generation from hydrolysis of the glucono delta lactone does not require any acceleration. Optionally, a suitable enzyme may be incorporated to increase the rate of hydrolysis as taught by U.S. Pat. No. 5,678,632.

All chemicals used in the process of the present invention will normally be technical grade to reduce the cost of the process.

The treatment fluid may contain further chemical additives such as are commonly used in acidizing applications, including but not being limited to surfactants, foaming and chelating agents if their inclusion is deemed to be beneficial and if they are compatible with the other components of the treatment fluid. Other chemical additives considered useful in the treatment fluids of the present invention are biostatic agents and biocidal agents.

The present invention has the following particular advantages over the prior art:

The method provides a simple, effective and convenient way of acidizing, particularly at low temperatures.

In some embodiments of the invention, all of the components of the treatment fluids are generally environmentally acceptable and of low environmental impact. This potentially makes the system much more suitable for use in sensitive environments, for example arctic environments than conventional acidizing systems.

Glucono delta lactone is Generally Recognised as Safe (GRAS) in the US. The preferred salts that are effective for preventing the precipitation of alkaline earth metal salts of gluconic acid, sodium acetate and sodium lactate, are also both GRAS.

In Europe, sodium acetate is on the OSPAR List of Substances Used and Discharged Offshore which Are Considered to Pose Little or No Risk to the Environment (PLONOR).

Preferred organic acid precursors suitable for generating salts effective for preventing the precipitation of alkaline earth metal salts of gluconic acid are acetate and lactate esters and polyesters which hydrolyse to generate lactic acid. These esters and polyesters are generally low hazard. In particular, acetate esters such as glycerol diacetate and glycerol triacetate are low toxicity with high flash point.

Another advantage of the system is that gluconate, a product of the system, is effective as an iron control agent, corrosion inhibitor, scale inhibitor or nucleation/crystal growth inhibitor.

The following examples illustrate the invention.

EXAMPLES

Example 1

Comparison of Solubility of Calcium Gluconate and Calcium Formate

The dissolving capacities of delta glucono lactone and Acidgen™ FG (a formic acid precursor commercially available from Cleansorb Limited of Guildford, UK) and their capacity for precipitation of calcium salts is shown in Table 1.

TABLE 1

| Acid precursor | Percent at which used (w/v) | Acid produced | Calculated dissolving capacity for calcium carbonate (g/l) at 100% conversion of acid precursor to organic acid | Calcium salt precipitated following acidising of calcium carbonate in fresh water |
|---|---|---|---|---|
| Glucono delta lactone | 1 | Gluconic | 2.8 | No |
| Glucono delta lactone | 2 | Gluconic | 5.6 | No |
| Glucono delta lactone | 3 | Gluconic | 8.4 | Yes |
| Glucono delta lactone | 5 | Gluconic | 14.0 | Yes |
| Glucono delta lactone | 10 | Gluconic | 28.0 | Yes |
| Acidgen FG* | 5 | Formic | 30.8 | No |
| Acidgen FG | 10 | Formic | 61.7 | No |
| Acidgen FG | 15 | Formic | 92.5 | No |

*Acidgen ™ FG is a proprietary formic acid precursor available from Cleansorb Limited.

Example 2

Effect of Incorporating Sodium Acetate or Sodium Lactate on Precipitate Formation 100 ml solutions were prepared in deionised water in 100 ml Duran bottles: 2.7 g of laboratory grade $CaCO_3$ was added to each solution. Acidizing was allowed to proceed at room temperature (approximately 25° C.) for 65 hours. To simulate the effect of low temperature spent acidizing solutions were placed in a refrigerator at 5° C. and observed at 20 hours for the presence of any precipitate.

These results indicated that in the absence of sodium acetate or sodium lactate, calcium gluconate was precipitated from the spent acidizing solution at 5° C., but the inclusion of either sodium acetate or sodium lactate in the acidizing formulation prevented the deposition of a precipitate.

TABLE 2

| Acidizing solution based on | Percent at which used (w/v) | Additional component | Percent at which used (w/v) | Calcium salt precipitated at 5° C. following acidising |
|---|---|---|---|---|
| Glucono delta lactone | 10 | None | Not applicable | Yes |
| Glucono delta lactone | 10 | Sodium acetate | 5 | No |
| Glucono delta lactone | 10 | Sodium lactate 60% solution | 10.8 | No |
| Glucono delta lactone | 22 | None | Not applicable | Yes |
| Glucono delta lactone | 22 | Sodium acetate | 5 | No |
| Glucono delta lactone | 22 | Sodium lactate 60% solution | 10.8 | No |

Example 3

Carbon Dioxide Release from Calcium Carbonate Acidized with a Solution of Glucono Delta Lactone and Sodium Acetate A 250 ml graduated glass measuring cylinder was filled with tap water, inverted with the top covered and then sat in a tub of water. The end of some plastic tubing was positioned under the inverted cylinder. The other end of the tubing was attached to a large bore needle which was inserted in to a sealed Wheaton bottle holding 0.983 g $CaCO_3$, 100 ml of deionised water containing 3.6 g D-(+)-Gluconic acid δ-lactone+1.8 g sodium acetate and a magnetic stirring bar. The experiment was conducted at room temperature 26° C.+/−1° C.

The Wheaton bottle was placed on a magnetic stirring platform and stirred whilst observing the volume of evolved $CO_2$ collected in the inverted cylinder. After 8 hours and 45 minutes all of the $CaCO_3$ had been dissolved.

The results (FIG. 1) show that acidizing with glucono delta lactone proceeded over several hours, indicating that this lactone gives useful rates of in-situ acid generation at room temperature.

What is claimed is:

1. An in-situ acidizing process which comprises:
   introducing a treatment fluid into an underground formation having an acid-soluble material contained therein, the treatment fluid comprising dissolved glucono delta lactone at a concentration of at least 2% w/v;
   contacting the treatment fluid with the acid-soluble material in a target zone;
   dissolving at least a portion of the acid-soluble material in the target zone by allowing the glucono delta lactone to hydrolyze to produce gluconic acid in-situ; and
   preventing precipitation of alkaline earth metal salts of gluconic acid or dissolving precipitated alkaline earth metal salts of gluconic acid by providing or generating a dissolved lactate or acetate salt in the treatment fluid, wherein the weight ratio of the glucono delta lactone and the lactate or acetate salt in the treatment fluid is from 10:1 to 1:5.
2. A process according to claim 1, wherein the lactate or acetate salt is at least one of sodium lactate, sodium acetate, potassium lactate, potassium acetate, ammonium lactate, ammonium acetate, calcium acetate and magnesium acetate.
3. A process according to claim 1, further comprising generating an acid from an acid precursor that is comprised in the treatment fluid, and generating the lactate or acetate salt in-situ in the treatment fluid by a reaction between a portion of the acid-soluble material and said acid.
4. A process according to claim 3 wherein the acid precursor is an ester of acetic or lactic acid or a polyester which hydrolyses to generate lactic acid.
5. A process according to claim 3 wherein the lactate or acetate salt is at least one of calcium lactate, magnesium lactate, calcium acetate and magnesium acetate.
6. A process according to claim 1 wherein the weight ratio of the glucono delta lactone and the lactate or acetate salt in the treatment fluid is from 3:1 to 1:3.
7. A process according to claim 1, which comprising performing said dissolving at least a portion of the acid-soluble material in the target zone at a temperature of 5 to 20° C.
8. A process according to claim 1, wherein the lactate or acetate salt comprises at least one of sodium lactate and sodium acetate.
9. A process according to claim 1 wherein the weight ratio of the glucono delta lactone and the lactate or acetate salt in the treatment fluid is from 2:1 to 1:2.
10. An in-situ acidizing process, comprising:
    introducing a treatment fluid into an underground formation having an acid-soluble material contained therein, the treatment fluid comprising dissolved glucono delta lactone at a concentration of at least 2% w/v;
    contacting the treatment fluid with the acid-soluble material in a target zone;
    dissolving at least a portion of the acid-soluble material in the target zone by allowing the glucono delta lactone to hydrolyze to produce gluconic acid in-situ; and
    preventing precipitation of alkaline earth metal salts of gluconic acid or dissolving precipitated alkaline earth metal salts of gluconic acid by providing or generating a dissolved lactate or acetate salt in the treatment fluid, wherein the lactate or acetate salt is at least one of sodium lactate, sodium acetate, potassium lactate, potassium acetate, ammonium lactate, ammonium acetate, calcium acetate and magnesium acetate.
11. An in-situ acidizing process, comprising:
    introducing a treatment fluid into an underground formation having an acid-soluble material contained therein, the treatment fluid comprising dissolved glucono delta lactone at a concentration of at least 2% w/v;
    contacting the treatment fluid with the acid-soluble material in a target zone;
    dissolving at least a portion of the acid-soluble material in the target zone, at a temperature of 5 to 20° C., by allowing the glucono delta lactone to hydrolyze to produce gluconic acid in-situ; and
    preventing precipitation of alkaline earth metal salts of gluconic acid or dissolving precipitated alkaline earth metal salts of gluconic acid by providing or generating a dissolved lactate or acetate salt in the treatment fluid, wherein the lactate or acetate salt is at least one of sodium lactate, sodium acetate, potassium lactate, potassium acetate, ammonium lactate, ammonium acetate, calcium acetate and magnesium acetate, and wherein the weight ratio of the glucono delta lactone and the lactate or acetate salt in the treatment fluid is from 10:1 to 1:5.

* * * * *